(12) United States Patent
Roth et al.

(10) Patent No.: US 9,249,299 B2
(45) Date of Patent: Feb. 2, 2016

(54) CUO/ZNO MIXTURES AS STABILIZERS FOR FLAME-RETARDANT POLYAMIDES

(71) Applicant: BASF SE, Ludwigshafen (DE)

(72) Inventors: Michael Roth, Lautertal (DE); Klaus Uske, Bad Dürkheim (DE); Matthias Scheibitz, Weinheim (DE); Christoph Minges, Burrweiler (DE)

(73) Assignee: BASF SE (DE)

( * ) Notice: Subject to any disclaimer, the term of this patent is extended or adjusted under 35 U.S.C. 154(b) by 74 days.

(21) Appl. No.: 13/769,979

(22) Filed: Feb. 19, 2013

(65) Prior Publication Data

US 2013/0217825 A1 Aug. 22, 2013

Related U.S. Application Data

(60) Provisional application No. 61/600,728, filed on Feb. 20, 2012.

(51) Int. Cl.
C08L 77/00 (2006.01)
C08K 3/22 (2006.01)
C08K 9/12 (2006.01)
C08L 23/08 (2006.01)
C08L 77/02 (2006.01)
C08L 77/06 (2006.01)
C08K 3/02 (2006.01)

(52) U.S. Cl.
CPC .............. C08L 77/00 (2013.01); C08L 23/08 (2013.01); C08L 77/02 (2013.01); C08L 77/06 (2013.01); C08K 3/22 (2013.01); C08K 9/12 (2013.01); C08K 2003/026 (2013.01)

(58) Field of Classification Search
CPC ..................................... C08K 3/22; C08K 3/32
See application file for complete search history.

(56) References Cited

U.S. PATENT DOCUMENTS

| | | | | | |
|---|---|---|---|---|---|
| 3,883,475 | A | * | 5/1975 | Racky et al. | 524/414 |
| 4,076,682 | A | * | 2/1978 | Theysohn et al. | 523/216 |
| 4,208,317 | A | * | 6/1980 | Cerny et al. | 523/205 |
| 4,879,067 | A | * | 11/1989 | Sakon et al. | 252/609 |
| 4,970,255 | A | * | 11/1990 | Reimann et al. | 524/321 |
| 5,225,056 | A | * | 7/1993 | Bridger et al. | 205/742 |
| 6,878,283 | B2 | * | 4/2005 | Thompson | 210/650 |
| 7,750,069 | B2 | * | 7/2010 | Yamashita et al. | 524/115 |
| 2004/0063815 | A1 | * | 4/2004 | Kinose et al. | 523/205 |
| 2013/0317143 | A1 | * | 11/2013 | Daga et al. | 524/116 |

FOREIGN PATENT DOCUMENTS

| | | | | |
|---|---|---|---|---|
| CN | 102093711 | A | * | 6/2011 |
| JP | 2000053870 | A | * | 2/2000 |
| JP | 2000319491 | A | * | 11/2000 |

OTHER PUBLICATIONS

Machine translated English equivalent of CN 102093711 (Jun. 2011, 4 pages).*
Machine translated English equivalent of JP 2000-053870 (Feb. 2000, 14 pages).*
Machine translated English language equivalent of JP 2000-319491 (Nov. 2000, 9 pages).*

* cited by examiner

*Primary Examiner* — Brieann R Fink
(74) *Attorney, Agent, or Firm* — Drinker Biddle & Reath LLP

(57) ABSTRACT

Thermoplastic molding compositions comprising
A) from 10 to 99.8% by weight of a thermoplastic polyamide,
B) from 0.1 to 60% by weight of red phosphorus,
C) from 0.05 to 5% by weight of a catalyst comprising copper and zinc and support material,
D) from 0 to 40% by weight of an impact modifier,
E) from 0 to 60% by weight of further additives,
where the total of the percentages by weight of A) to E) is 100%.

11 Claims, No Drawings

CUO/ZNO MIXTURES AS STABILIZERS FOR FLAME-RETARDANT POLYAMIDES

CROSS-REFERENCE TO RELATED APPLICATIONS

This application claims the benefit of U.S. Provisional Application No. 61/600,728, filed Feb. 20, 2012, which is incorporated herein by reference.

The invention relates to thermoplastic molding compositions comprising

A) from 10 to 99.8% by weight of a thermoplastic polyamide,
B) from 0.1 to 60% by weight of red phosphorus,
C) from 0.05 to 5% by weight of a catalyst comprising copper and zinc and support material,
D) from 0 to 40% by weight of an impact modifier,
E) from 0 to 60% by weight of further additives,
where the total of the percentages by weight of A) to E) is 100%.

The present invention also relates to the use of molding compositions of this type for producing fibers, films, and moldings, and to the moldings, fibers, and films of any type thus obtainable.

Addition of red phosphorus to thermoplastics, especially to reinforced or filled polyamides, is known to lead to effective fire protection (DE-A-1931387). However, under unfavorable conditions, e.g. elevated temperature or moisture, or presence of alkali or oxygen, red phosphorus tends to form decomposition products, such as phosphine and acids of mono- to pentavalent phosphorus. Although red phosphorus incorporated within thermoplastics, e.g. polyamides, has substantial protection from thermal oxidation as a consequence of embedment into the polymer, formation of decomposition products can nevertheless still occur here over prolonged periods. This is disadvantageous because if pellets are not correctly processed in the injection-molding process, the resultant phosphine can cause odor problems and is moreover toxic. The phosphorus acids produced at the same time can deposit on the surface of moldings, a particular result being that the moldings have reduced tracking resistance. There has therefore been no lack of attempts to improve the stability of red phosphorus used as flame retardant for plastics. By way of example, a stabilizing effect can be achieved via addition of oxides or hydroxides of zinc, of magnesium, or of copper. In DE-A-2625691, in addition to said stabilization via metal oxides, a polymer is used to coat the phosphorus particles. However, said coating or encapsulation process is very complicated, and the stabilizing effect of the system is moreover not always satisfactory.

Catalysts based on CuO/ZnO are available commercially and are generally used as synthesis gas catalysts or for gas purification: see by way of example DE-A 37 17 111, DE-A 43 01 469, WO2002/94435, WO2004/22223, and WO2007/093526.

It is therefore an object of the present invention to develop thermoplastic molding compositions which comprise, as flame retardant, a red phosphorus that has been stabilized in an effective manner. The stabilizers are moreover intended to feature good stability during processing and particularly homogeneous dispersibility in the plastics melt. The intention was moreover to reduce or eliminate the release of volatile phosphorus compounds which are responsible for the formation of contact deposits on metallic conductors.

The molding compositions defined in the introduction have accordingly been found. Preferred embodiments are given in the dependent claims.

Surprisingly, it has been found that thermoplastic molding compositions which comprise even small amounts of above catalysts as stabilizer provide excellent compliance with the properties required.

The molding compositions of the invention comprise, as component A), from 10 to 99.8% by weight, preferably from 20 to 98% by weight, and in particular from 30 to 90% by weight, of at least one polyamide.

The polyamides of the molding compositions of the invention generally have an intrinsic viscosity of from 90 to 350 ml/g, preferably from 110 to 240 ml/g, determined in a 0.5% strength by weight solution in 96% strength by weight sulfuric acid at 25° C. to ISO 307.

Preference is given to semicrystalline or amorphous resins with a molecular weight (weight average) of at least 5000, described by way of example in the following U.S. Pat. Nos.: 2,071,250, 2,071,251, 2,130,523, 2,130,948, 2,241,322, 2,312,966, 2,512,606, and 3,393,210.

Examples of these are polyamides that derive from lactams having from 7 to 13 ring members, e.g. polycaprolactam, polycaprylolactam, and polylaurolactam, and also polyamides obtained via reaction of dicarboxylic acids with diamines.

Dicarboxylic acids which may be used are alkanedicarboxylic acids having 6 to 12, in particular 6 to 10, carbon atoms, and aromatic dicarboxylic acids. Merely as examples, acids that may be mentioned here are adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, or else m-xylylenediamine (e.g. Ultramid® X17 from BASF SE, where the molar ratio of MXDA to adipic acid is 1:1), di(4-aminophenyl)methane, di(4-aminocyclohexyl)methane, 2,2-di(4-aminophenyl)propane, 2,2-di(4-aminocyclohexyl)propane, or 1,5-diamino-2-methyl-pentane.

Preferred polyamides are polyhexamethyleneadipamide, polyhexamethylenesebacamide, and polycaprolactam, and also nylon-6/6,6 copolyamides, in particular having a proportion of from 5 to 95% by weight of caprolactam units (e.g. Ultramid® C31 from BASF SE).

Other suitable polyamides are obtainable from ω-aminoalkylnitriles, e.g. aminocapronitrile (PA 6) and adiponitrile with hexamethylenediamine (PA 66) via what is known as direct polymerization in the presence of water, for example as described in DE-A 10313681, EP-A 1198491 and EP 922065.

Mention may also be made of polyamides obtainable, by way of example, via condensation of 1,4-diaminobutane with adipic acid at an elevated temperature (nylon-4,6). Preparation processes for polyamides of this structure are described by way of example in EP-A 38 094, EP-A 38 582, and EP-A 39 524.

Other suitable examples are polyamides obtainable via copolymerization of two or more of the abovementioned monomers, and mixtures of two or more polyamides in any desired mixing ratio. Particular preference is given to mixtures of nylon-6,6 with other polyamides, in particular nylon-6/6,6 copolyamides.

Other copolyamides which have proven particularly advantageous are semiaromatic copolyamides, such as PA 6/6T and PA 66/6T, where the triamine content of these is less than 0.5% by weight, preferably less than 0.3% by weight (see EP-A 299 444). Other polyamides resistant to high temperatures are known from EP-A 19 94 075 (PA 6T/6I/MXD6).

The processes described in EP-A 129 195 and 129 196 can be used to prepare the preferred semiaromatic copolyamides with low triamine content.

The following list, which is not comprehensive, comprises the polyamides A) mentioned and other polyamides A) for the purposes of the invention, and the monomers comprised.

AB polymers:
PA 4 Pyrrolidone
PA 6 ε-Caprolactam
PA 7 Ethanolactam
PA 8 Caprylolactam
PA 9 9-Aminopelargonic acid
PA 11 11-Aminoundecanoic acid
PA 12 Laurolactam
AA/BB polymers
PA 46 Tetramethylenediamine, adipic acid
PA 66 Hexamethylenediamine, adipic acid
PA 69 Hexamethylenediamine, azelaic acid
PA 610 Hexamethylenediamine, sebacic acid
PA 612 Hexamethylenediamine, decanedicarboxylic acid
PA 613 Hexamethylenediamine, undecanedicarboxylic acid
PA 1212 1,12-Dodecanediamine, decanedicarboxylic acid
PA 1313 1,13-Diaminotridecane, undecanedicarboxylic acid
PA 6T Hexamethylenediamine, terephthalic acid
PA 9T 1,9-Nonanediamine, terephthalic acid
PA MXD6 m-Xylylenediamine, adipic acid
PA 6I Hexamethylenediamine, isophthalic acid
PA 6-3-T Trimethylhexamethylenediamine, terephthalic acid
PA 6/6T (see PA 6 and PA 6T)
PA 6/66 (see PA 6 and PA 66)
PA 6/12 (see PA 6 and PA 12)
PA 66/6/610 (see PA 66, PA 6 and PA 610)
PA 6I/6T (see PA 6I and PA 6T)
PA PACM 12 Diaminodicyclohexylmethane, laurolactam
PA 6I/6T/PACM as PA 6I/6T+diaminodicyclohexylmethane
PA 12/MACMI Laurolactam, dimethyldiaminodicyclohexylmethane, isophthalic acid
PA 12/MACMT Laurolactam, dimethyldiaminodicyclohexylmethane, terephthalic acid
PA PDA-T Phenylenediamine, terephthalic acid Preferred flame retardant B) is elemental red phosphorus, in particular in combination with glass fiber-reinforced molding compositions; it can be used in untreated form.

However, particularly suitable preparations are those in which the phosphorus has been surface-treated with low-molecular-weight liquid substances, such as silicone oil, paraffin oil, or esters of phthalic acid (in particular dioctyl phthalate, see EP 176 836) or adipic acid, or with polymeric or oligomeric compounds, e.g. with phenolic resins or aminoplastics, or else with polyurethanes (see EP-A 384 232, DE-A 196 48 503). Amounts comprised of these "phlegmatizing agents" are generally from 0.05 to 5% by weight, based on 100% by weight of B).

Concentrates of red phosphorus are also suitable as flame retardant, e.g. in a polyamide or elastomer. Particularly suitable concentrate polymers are polyolefin homopolymers and polyolefin copolymers. However, the proportion of the concentrate polymer—if no polyamide is used as thermoplastic—should not exceed 35% by weight, based on the weight of components A) and B) in the molding compositions of the invention.

Preferred concentrate compositions are
B$_1$) from 30 to 90% by weight, preferably from 45 to 70% by weight, of a polyamide or elastomer, and
B$_2$) from 10 to 70% by weight, preferably from 30 to 55% by weight, of red phosphorus.

The polyamide used for the masterbatch can differ from A) or can preferably be identical with A), so that the molding composition does not suffer any adverse effect caused by incompatibility phenomena or by melting point differences.

The average particle size (d50) of the phosphorus particles dispersed in the molding compositions is preferably in the range from 0.0001 to 0.5 mm; in particular from 0.001 to 0.2 mm.

The content of component B) in the molding compositions of the invention is from 0.1 to 60% by weight, preferably from 0.5 to 40% by weight, and in particular from 1 to 15% by weight, based on the entirety of components A) to E).

The molding compositions of the invention comprise, as component C), from 0.05 to 5% by weight, preferably from 0.1 to 2% by weight, and in particular from 0.1 to 1.5% by weight, and very particularly preferably from 0.1 to 1% by weight, of a catalyst comprising Cu, Zn, and support material.

For the actual purposes of the person skilled in the art, these involve adsorption compositions or absorption compositions which are however often termed "catalysts" even though when they are used in accordance with instructions they do not actually have catalytic effect.

The BET surface area of the component is preferably from 1 to 350 m$^2$/g, in particular from 10 to 250 m$^2$/g, particularly preferably from 20 to 150 m$^2$/g (in accordance with ISO 9277, under nitrogen).

Suitable inert support materials are Al oxides, silicon dioxides, titanium dioxides, magnesium oxide, iron oxides, zirconium dioxide, aluminosilicates, clays, zeolites, diatomaceous earth, hydrotalcites, fumed silica, or a mixture of these, preference being given to Al oxides and/or zirconium dioxides.

The catalysts of the invention comprise copper, which is to some extent present as metallic Cu and otherwise is present in the form of Cu(I) oxides and of Cu(II) oxides.

The amount of catalyst Cu present in the preferred catalyst mixture, calculated as CuO, is at least 30% by weight, preferably 35% by weight, and in particular 40% by weight, and at most 70% by weight, preferably at most 65% by weight, of CuO, based in each case on the total amount of the catalyst composition.

Preferred amounts of ZnO are from 15 to 60% by weight, preferably from 15 to 55% by weight, and in particular from 15 to 48% by weight, of ZnO.

The preferred proportion of the support material is from 1 to 35% by weight, preferably from 10 to 35% by weight, and in particular from 13 to 30% by weight, preference being given to aluminum dioxide and/or zirconium dioxide.

The catalysts C) can moreover comprise, within the mixture, from 0 to 5% by weight, preferably from 0 to 2% by weight, and in particular from 0 to 1% by weight, of further promoters.

These are elements or oxides selected from alkali metals, alkaline earth metals, rare earths, Sc, Ti, V, Cr, Y, Zr, B, Si, Ge, P, Bi, or a mixture of these, and preferably Co, Fe, Ni, W, Cr, Mo, Mn, K, Mg, Ca, Cu, Zn or Al.

Particularly preferred catalysts C) are mixtures of
from 30 to 65% by weight, preferably from 35 to 65% by weight of CuO,
from 15 to 60% by weight, preferably from 15 to 55% by weight of ZnO,
from 10 to 35% by weight, preferably from 13 to 30% by weight of Al dioxides,
from 0 to 5% by weight, preferably from 0 to 2% by weight of promoters,
where the total of the percentages by weight is 100% by weight.

The shape and form of the catalysts of the invention can be selected as desired, examples being tablets, rings, stars, wagon-wheels, and extrudates, such as cylinders, pellets, or strands, preference being given to annular tablets or tablets or in powder form as component C).

Production of the catalysts of the invention generally gives these in "oxidized" form, i.e. the copper in the catalyst takes the form of copper oxides in a mixture with Cu.

The production of the catalysts C) is known to the person skilled in the art and can by way of example be achieved by precipitating the corresponding salts together with an alkaline precipitant reagent and then drying and calcination of the solids at elevated temperature (see DE-A 37 17 111).

Another production method as in DE-A 43 01 469 uses aqueous impregnation of spinels of the structure $M-Al_2O_4$ in an $Al_2O_3$ matrix with metal salt solutions, and kneading with the corresponding metal oxides and subsequent calcination (see DE-A 43 01 469).

Further production methods can be found in WO2002/94435, WO2004/22223, and WO2007/093526.

Preferred catalysts C) are used together with acid scavengers based on hydrotalcites or oxides or hydroxides or salts of zinc or of the alkaline earth metals, in the molding composition.

The mixing ratio is preferably from 10:1 to 1:10, in particular from 5:1 to 1:5 (ratio by weight).

Suitable acid scavengers are ZnO, Zn borate, Zn stannate, MgO, $Mg(OH)_2$, $ZnCO_3$, $MgCO_3$, $CaCO_3$, Mg Ca carbonates AlOOH, and particular preference is given here to ZnO, basic $ZnCO_3$, $Mg(OH)_2$ or $CaCO_3$.

The molding compositions comprise, as component D), amounts of from 0 to 40% by weight, preferably from 1 to 30% by weight, in particular from 2 to 20% by weight, of elastomeric polymers (often also termed impact modifiers, elastomers, or rubbers).

These are very generally copolymers preferably composed of at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type are described, for example, in Houben-Weyl, Methoden der organischen Chemie, Vol. 14/1 (Georg-Thieme-Verlag, Stuttgart, Germany, 1961), pages 392-406, and in the monograph by C. B. Bucknall, "Toughened Plastics" (Applied Science Publishers, London, 1977).

Some preferred types of such elastomers are described below.

Preferred types of such elastomers are those known as ethylene-propylene (EPM) and ethylene-propylene-diene (EP DM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[$5.2.1.0^{2,6}$]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM rubbers and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formulae I or II or III or IV

where $R^1$ to $R^9$ are hydrogen or alkyl groups having from 1 to 6 carbon atoms, and m is a whole number from 0 to 20, g is a whole number from 0 to 10 and p is a whole number from 0 to 5.

The radicals $R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers composed of
from 50 to 98% by weight, in particular from 55 to 95% by weight, of ethylene,
from 0.1 to 40% by weight, in particular from 0.3 to 20% by weight, of glycidyl acrylate and/or
glycidyl methacrylate, (meth)acrylic acid and/or maleic anhydride, and
from 1 to 45% by weight, in particular from 5 to 40% by weight, of n-butyl acrylate and/or 2-ethylhexyl acrylate.

Other preferred (meth)acrylates are the methyl, ethyl, propyl, isobutyl and tert-butyl esters.

Comonomers which may be used alongside these are vinyl esters and vinyl ethers.

The ethylene copolymers described above may be prepared by processes known per se, preferably by random copolymerization at high pressure and elevated temperature. Appropriate processes are well known.

Other preferred elastomers are emulsion polymers whose preparation is described, for example, by Blackley in the monograph "Emulsion Polymerization". The emulsifiers and catalysts which can be used are known per se.

In principle it is possible to use homogeneously structured elastomers or else those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the general formula

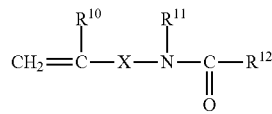

where the substituents can be defined as follows, $R^{10}$ is hydrogen or a $C_1$-$C_4$-alkyl group, $R^{11}$ is hydrogen, a $C_1$-$C_8$-alkyl group or an aryl group, in particular phenyl, $R^{12}$ is hydrogen, a $C_1$-$C_{10}$-alkyl group, a $C_6$-$C_{12}$-aryl group, or —$OR^{13}$ $R^{13}$ is a $C_1$-$C_8$-alkyl group or a $C_6$-$C_{12}$-aryl group, which can optionally have substitution by groups that comprise O or by groups that comprise N, X is a chemical bond a $C_1$-$C_{10}$-alkylene aroup, or a $C_6$-$C_{12}$-arylene group, or

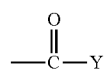

Y is O—Z or NH—Z, and

Z is a $C_1$-$C_{10}$-alkylene or $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope composed of monomers as described under I and II for the core, second |

| Type | Monomers for the core | Monomers for the envelope |
|---|---|---|
| | | envelope as described under I or IV for the envelope |

Instead of graft polymers whose structure has more than one shell, it is also possible to use homogeneous, i.e. single-shell, elastomers composed of 1,3-butadiene, isoprene and n-butyl acrylate or of copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core composed of n-butyl acrylate or based on butadiene and with an outer envelope composed of the abovementioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

Particularly preferred rubbers D) are ethylene copolymers, as described above, which comprise functional monomers, where the functional monomers have been selected from the group of the carboxylic acid, anhydride, carboxylic ester, carboxamide, carboximide, amino, hydroxy, epoxy, urethane, and oxazoline groups, and mixtures of these.

The proportion of the functional groups is from 0.1 to 20% by weight, preferably from 0.2 to 10% by weight, and in particular from 0.3 to 7.0% by weight, based on 100% by weight of D).

Particularly preferred monomers are composed of an ethylenically unsaturated mono- or dicarboxylic acid or of a functional derivative of this type of acid.

In principle any of the primary, secondary, and tertiary $C_1$-$C_{18}$-alkyl esters of acrylic acid or methacrylic acid is suitable, but preference is given to esters having from 1 to 12 carbon atoms, in particular having from 2 to 10 carbon atoms.

Examples of these are methyl, ethyl, propyl, n-butyl, isobutyl, and tert-butyl, 2-ethylhexyl, octyl, and decyl acrylates and the corresponding methacrylates. Among these, particular preference is given to n-butyl acrylate and 2-ethylhexyl acrylate.

Instead of the esters or in addition to these, it is also possible that the olefin polymers comprise acid-functional and/or latent acid-functional monomers of ethylenically unsaturated mono- or dicarboxylic acids, or comprise monomers having epoxy groups.

Other examples that may be mentioned of monomers are acrylic acid, methacrylic acid, tertiary alkyl esters of said acids, in particular tert-butyl acrylate, and dicarboxylic acids, such as maleic acid and fumaric acid, and derivatives of said acids, and also monoesters of these.

Latent acid-functional monomers are compounds which form free acid groups under the polymerization conditions and, respectively, during incorporation of the olefin polymers into the molding compositions. Examples of these that may be mentioned are anhydrides of dicarboxylic acids having up to 20 carbon atoms, in particular maleic anhydride, and tertiary $C_1$-$C_{12}$-alkyl esters of the abovementioned acids, in particular tert-butyl acrylate and tert-butyl methacrylate.

The acid-functional or latent acid-functional monomers and the monomers comprising epoxy groups are preferably incorporated into the olefin polymers via addition of compounds of the general formulae I-IV to the monomer mixture.

The melt index of the ethylene copolymers is generally in the range from 1 to 80 g/10 min (measured at 190° C. with 2.16 kg load).

The molar mass of said ethylene-α-olefin copolymers is from 10 000 to 500 000 g/mol, preferably from 15 000 to 400 000 g/mol (Mn, determined by means of GPC in 1,2,4-trichloro-benzene with PS calibration).

In one particular embodiment, ethylene-α-olefin copolymers are used which have been produced by means of what are known as "single site catalysts". Further details can be found in U.S. Pat. No. 5,272,236. In this case, the molecular weight distribution of the ethylene-α-olefin copolymers is narrow for polyolefins, being smaller than 4, preferably smaller than 3.5.

Preferred commercially available products B used are Exxelor® VA 1801 or 1803, Kraton® G 1901 FX or Fusabond® N NM493 D or Fusabond® A560 from Exxon, Kraton and DuPont, and also Tafmer®MH 7010 from Mitsui.

It is also possible, of course, to use mixtures of the types of rubber listed above.

The molding compositions of the invention can comprise, as component E), up to 60% by weight, preferably up to 50% by weight, of further additives.

Fibrous or particulate fillers E) that may be mentioned are carbon fibers, glass fibers, glass beads, amorphous silica, calcium silicate, calcium metasilicate, magnesium carbonate, kaolin, chalk, powdered quartz, mica, barium sulfate, and feldspar, and the amounts of these that can be used are from 1 to 50% by weight, in particular from 5 to 40% by weight, preferably from 10 to 40% by weight.

Preferred fibrous fillers that may be mentioned are carbon fibers, aramid fibers, and potassium titanate fibers, particular preference being given to glass fibers in the form of E glass. These can be used as rovings or in the commercially available forms of chopped glass.

The fibrous fillers may have been surface-pretreated with a silane compound to improve compatibility with the thermoplastic.

Suitable silane compounds have the general formula

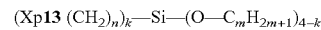

where the definitions of the substituents are as follows:

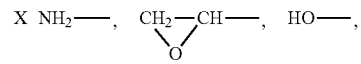

n is a whole number from 2 to 10, preferably 3 to 4,
m is a whole number from 1 to 5, preferably 1 to 2, and
k is a whole number from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which comprise a glycidyl group as substituent X.

The amounts of the silane compounds generally used for surface-coating are from 0.01 to 2% by weight, preferably from 0.025 to 1.0% by weight and in particular from 0.05 to 0.5% by weight (based on E)).

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may, if appropriate, have been pretreated with the abovementioned silane compounds, but the pretreatment is not essential.

Other fillers which may be mentioned are kaolin, calcined kaolin, wollastonite, talc and chalk, and also lamellar or acicular nanofillers, the amounts of these preferably being from 0.1 to 10%. Materials preferred for this purpose are boehmite, bentonite, montmorillonite, vermiculite, hectorite, and laponite. The lamellar nanofillers are organically modified by prior-art methods, to give them good compatibility with the organic binder. Addition of the lamellar or acicular nanofillers to the inventive nanocomposites gives a further increase in mechanical strength.

The molding compositions of the invention can comprise, as component E), from 0.05 to 3% by weight, preferably from 0.1 to 1.5% by weight, and in particular from 0.1 to 1% by weight, of a lubricant.

Preference is given to the salts of Al, of alkali metals, or of alkaline earth metals, or esters or amides of fatty acids having from 10 to 44 carbon atoms, preferably having from 12 to 44 carbon atoms.

The metal ions are preferably alkaline earth metal and Al, particular preference being given to Ca or Mg.

Preferred metal salts are Ca stearate and Ca montanate, and also Al stearate.

It is also possible to use a mixture of various salts, in any desired mixing ratio.

The carboxylic acids can be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be monohydric to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines can be monobasic to tribasic. Examples of these are stearylamine, ethylenediamine, propylenediamine, hexamethylenediamine, di(6-aminohexyl) amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or of esters with amides in combination, in any desired mixing ratio.

The molding compositions of the invention can comprise, as component E), from 0.05 to 3% by weight, preferably from 0.1 to 1.5% by weight, and in particular from 0.1 to 1% by weight, of a Cu stabilizer, preferably of a Cu(I) halide, in particular in a mixture with an alkali metal halide, preferably KI, in particular in the ratio 1:4, or of a sterically hindered phenol, or a mixture of these.

Preferred salts of monovalent copper used are copper(I) acetate, copper(I) chloride, copper(I) bromide, and copper(I) iodide. Phosphine complexes (specifically bis(triphenylphosphine)copper iodide) may also be present. The materials comprise these in amounts of from 5 to 500 ppm of copper, preferably from 10 to 250 ppm, based on polyamide.

The advantageous properties are in particular obtained if the copper is present with molecular distribution in the polyamide. This is achieved if a concentrate comprising the polyamide, and comprising a salt of monovalent copper, and comprising an alkali metal halide, in the form of a solid, homogeneous solution is added to the molding composition. By way of example, a typical concentrate is composed of from 79 to 95% by weight of polyamide and from 21 to 5% by weight of a mixture composed of copper iodide or copper bromide and potassium iodide. The copper concentration in the solid homogeneous solution is preferably from 0.3 to 3% by weight, in particular from 0.5 to 2% by weight, based on the total weight of the solution, and the molar ratio of copper (I) iodide to potassium iodide is from 1 to 11.5, preferably from 1 to 5.

Suitable polyamides for the concentrate are homopolyamides and copolyamides, in particular nylon-6 and nylon-6,6.

Suitable sterically hindered phenols E) are in principle all of the compounds which have a phenolic structure and which have at least one bulky group on the phenolic ring.

It is preferable to use, for example, compounds of the formula.

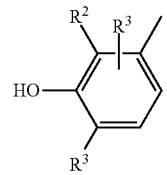

where:
$R^1$ and $R^2$ are an alkyl group, a substituted alkyl group, or a substituted triazole group, and where the radicals $R^1$ and $R^2$ may be identical or different, and $R^3$ is an alkyl group, a substituted alkyl group, an alkoxy group, or a substituted amino group.

Antioxidants of the abovementioned type are described by way of example in DE-A 27 02 661 (U.S. Pat. No. 4,360,617).

Another group of preferred sterically hindered phenols is provided by those derived from substituted benzenecarboxylic acids, in particular from substituted benzenepropionic acids.

Particularly preferred compounds from this class are compounds of the formula

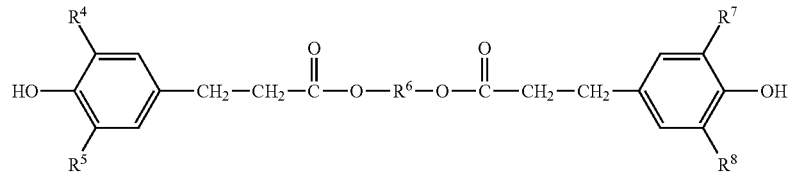

where $R^4$, $R^5$, $R^7$, and $R^8$, independently of one another, are $C_1$-$C_8$-alkyl groups which themselves may have substitution (at least one of these being a bulky group), and $R^6$ is a divalent aliphatic radical which has from 1 to 10 carbon atoms and whose main chain may also have C—O bonds.

Preferred compounds corresponding to this formula are

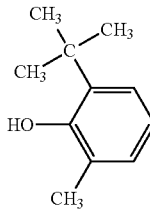 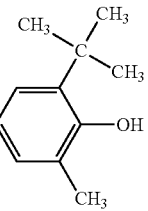

(Irganox® 245 from BASF SE)

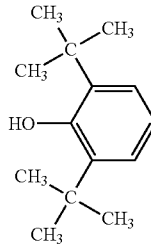 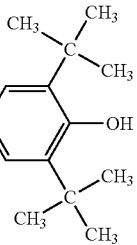

(Irganox® 259 from BASF SE)

All of the following should be mentioned as examples of sterically hindered phenols:

2,2'-methylenebis(4-methyl-6-tert-butylphenol), 1,6-hexanediol bis[3-(3,5-di-tert-butyl-4-hydroxyphenyl)propionate], pentaerythrityl tetrakis[3-(3,5-di-tert-butyl-4-hydroxyphenyl)-propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di-tert-butylphenol), 3,5-di-tert-butyl-4-hydroxybenzyldimethylamine.

Compounds which have proven particularly effective and which are therefore used with preference are 2,2'-methylenebis(4-methyl-6-tert-butylphenol), 1,6-hexanediol bis(3,5-di-tert-butyl-4-hydroxyphenyl)propionate (Irganox® 259), pentaerythrityl tetrakis[3-(3,5-di-tert-butyl-4-hydroxyphenyl)propionate], and also N,N'-hexamethylenebis-3,5-di-tert-butyl-4-hydroxy-hydrocinnamide (Irganox® 1098), and the product Irganox® 245 described above from BASF SE, which has particularly good suitability.

The amount comprised of the antioxidants E), which can be used individually or as a mixture, is from 0.05 up to 3% by weight, preferably from 0.1 to 1.5% by weight, in particular from 0.1 to 1% by weight, based on the total weight of the molding compositions A) to E).

In some instances, sterically hindered phenols having not more than one sterically hindered group in ortho-position with respect to the phenolic hydroxy group have proven particularly advantageous; in particular when assessing colorfastness on storage in diffuse light over prolonged periods.

The molding compositions of the invention can comprise, as component E), from 0.05 to 5% by weight, preferably from 0.1 to 2% by weight, and in particular from 0.25 to 1.5% by weight, of a nigrosin.

Nigrosins are generally a group of black or gray phenazine dyes (azine dyes) related to the indulines and taking various forms (water-soluble, oleosoluble, spirit-soluble), used in wool dyeing and wool printing, in black dyeing of silks, and in the coloring of leather, of shoe creams, of varnishes, of plastics, of stoving lacquers, of inks, and the like, and also as microscopy dyes.

Nigrosins are obtained industrially via heating of nitrobenzene, aniline, and aniline hydrochloride with metallic iron and FeCl3 (the name being derived from the Latin niger=black).

Component E) can be used in the form of free base or else in the form of salt (e.g. hydrochloride).

Further details concerning nigrosins can be found by way of example in the electronic encyclopedia Rompp Online, Version 2.8, Thieme-Verlag Stuttgart, 2006, keyword "Nigrosin".

The thermoplastic molding compositions of the invention can comprise, as component E), conventional processing aids, such as stabilizers, oxidation retarders, agents to counteract decomposition by heat and decomposition by ultraviolet light, lubricants and mold-release agents, colorants, such as dyes and pigments, nucleating agents, plasticizers, etc.

Examples of oxidation retarders and heat stabilizers are sterically hindered phenols and/or phosphites and amines (e.g. TAD), hydroquinones, aromatic secondary amines, such as diphenylamines, various substituted members of these groups, and mixtures of these, in concentrations of up to 1% by weight, based on the weight of the thermoplastic molding compositions.

UV stabilizers that may be mentioned, the amounts of which used are generally up to 2% by weight, based on the molding composition, are various substituted resorcinols, salicylates, benzotriazoles, and benzophenones.

Materials that can be added as colorants are inorganic pigments, such as titanium dioxide, ultramarine blue, iron oxide, and carbon black, and also organic pigments, such as phthalocyanines, quinacridones, perylenes, and also dyes, such as anthraquinones.

Materials that can be used as nucleating agents are sodium phenylphosphinate, aluminum oxide, silicon dioxide, and also preferably talc powder.

The thermoplastic molding compositions of the invention can be produced by processes known per se, by mixing the starting components in conventional mixing apparatus, such as screw-based extruders, Brabender mixers, or Banbury mixers, and then extruding the same. The extrudate can be cooled and pelletized. It is also possible to premix individual components and then to add the remaining starting materials individually and/or likewise in the form of a mixture. The mixing temperatures are generally from 230 to 320° C.

In another preferred mode of operation, components B) and C) and also, if appropriate, D) and E) can be mixed with a prepolymer, compounded, and pelletized. The resultant pellets are then solid-phase condensed under an inert gas continuously or batchwise at a temperature below the melting point of component A) until the desired viscosity has been reached.

The thermoplastic molding compositions of the invention feature good flame retardancy and excellent phosphorus stability. These materials are therefore suitable for producing fibers, foils, and moldings of any type. Some examples are mentioned hereinafter: plug connectors, plugs, plug parts, cable harness components, circuit mounts, circuit mount components, three-dimensionally injection-molded circuit mounts, electrical connector elements, and mechatronic components.

The moldings or semifinished products to be produced in the invention from the thermoplastic molding compositions can be used by way of example in the motor vehicle industry, electrical industry, electronics industry, telecommunications industry, information technology industry, entertainment industry, or computer industry, in vehicles and other conveyances, in ships, in spacecraft, in households, in office equipment, in sports, in medicine, and also generally in articles and parts of buildings which require increased fire protection.

Improved-flow polyamides can be used in the kitchen and household sector for producing components for kitchen equipment, e.g. fires, smoothing irons, buttons, and also for garden- and leisure-sector applications.

EXAMPLES

The following components were used:
Component A:
Nylon-6,6 with intrinsic viscosity IV 150 mL/g, measured in 0.5% by weight solution in 96% by weight sulfuric acid at 25° C. to ISO 307 (using Ultramid A27 from BASF SE).
Component B:
50% concentrate of red phosphorus of average particle size (d50) from 10 to 30 μm in an olefin polymer made of: 59.8% by weight of ethylene, 35% by weight of n-butyl acrylate, 4.5% by weight of acrylic acid, and 0.7% by weight of maleic anhydride (component D) with melt index MFI (190/2.16) 10 g/10 min. The copolymer was produced via copolymerization of the monomers at elevated temperature and elevated pressure.
Component C/1: commercially available zinc oxide (for comparison).
Component C/2:
Cu/Zn/Al oxide mixture catalyst:
40% by weight of CuO
40% by weight of ZnO
20% by weight of $Al_2O_3$
(Puristar® R3-12 from BASF SE)
BET surface area: 70 $m^2/g$
Component E/1:
Standard chopped glass fiber for polyamides, length=4.5 mm, diameter=10 μm.

Component E/2:
N,N'-Hexamethylenebis-3,5-di-tert-butyl-4-hydroxyhydrocinnamide (Irganox® 1098)
Component E/3:
Ca stearate In order to provide evidence of the phosphorus stability improvements described in the invention, appropriate plastics molding compositions were manufactured via compounding. To this end, the individual components were mixed in a ZSK 26 (Berstorff) twin-screw extruder with throughput 20 kg/h and a flat temperature profile at about 270° C., extruded in the form of strand, cooled until pelletizable, and pelletized.

The test specimens for the study set out in Table 1 were injection-molded in an Arburg 420C injection-molding machine at a melt temperature of about 270° C. and mold temperature of about 80° C.

Testing of plastics parts for phosphorus deposition:
A plastics specimen (125×12.5×1.6 mm) was halved, and each half was placed in a 10 ml glass beaker. A silver contact material (10×50×0.125 mm) was placed in a short test tube. The three specimens were then placed in a 100 ml screw-cap bottle, 5 ml of water was added, and the sealed system was placed in a drying oven at 70° C. After 28 days, the test tube was removed and filled to the top with water, and the entire contents were placed in a glass beaker. 5 ml of conc. hydrochloric acid were added to this, and the mixture was evaporated almost to dryness. The metal specimen was then removed and rinsed with water; 1 ml of sulfuric acid was admixed with the residue, and the mixture was again evaporated almost to dryness. 20 ml of water is then used for dilution, 4 ml of 5% potassium peroxodisulfate solution are added, and the mixture is heated for 30 minutes. Phosphorus was then determined photometrically by using molybdenum blue, in μg of phosphorus/plastics specimen.

The table gives the constitutions of the molding compositions and the results of the measurements.

TABLE

| Components [% by weight] | Comparative example | Inventive example |
|---|---|---|
| A | 60.6 | 61.05 |
| B + D | 12 | 12 |
| E/1 | 26 | 26 |
| C/1 | 0.7 | — |
| C/2 | — | 0.25 |
| E/2 + E/3 (50:50) | 0.7 | 0.7 |
| Phosphorus deposition after 28 days/70° C. in μg of phosphorus/specimen | 150 | 7 |

The invention claimed is:
1. A thermoplastic molding composition comprising
A) from 10 to 99.8% by weight of a thermoplastic polyamide,
B) from 0.1 to 60% by weight of red phosphorus,
C) from 0.05 to 5% by weight of a catalyst comprising a mixture of
from 30 to 70% by weight of CuO and
from 15 to 60% by weight of ZnO
from 1 to 35% by weight of support material which comprises Al oxide, Si oxide, $TiO_2$, MgO, or iron oxide, zirconium dioxide, aluminosilicates, clays, zeolites, diatomaceous earth, hydrotalcites, or fumed silica, or of a mixture thereof, and
from 0 to 10% by weight of further promoters,
where the percentages by weight, based on the weight of C, do not exceed 100%,

D) from 0 to 40% by weight of an impact modifier,
E) from 0 to 60% by weight of further additives,
where the total of the percentages by weight of A) to E) do not exceed 100%;
wherein the catalyst is made by a process comprising:
precipitating salts corresponding to CuO and ZnO on the support material, followed by drying and calcining.

2. The thermoplastic molding composition according to claim 1, comprising
A) from 20 to 98% by weight of the thermoplastic polyamide;
B) from 0.5 to 40% by weight of the red phosphorus;
C) from 0.1 to 2% by weight of the catalyst;
D) from 1 to 30% by weight of the impact modifier; and
E) from 0 to 50% by weight of the further additives.

3. The thermoplastic molding composition according to claim 1, in which the BET surface area of component C) is from 1 to 350 m2/g.

4. The thermoplastic molding composition according to claim 1, comprising, as further promoters of the catalyst C), oxides or elements selected from alkali metals, alkaline earth metals, rare earths, Sc, Ti, V, Cr, Y, Zr, B, Si, Ge, P, Bi, Co, Fe, Ni, W, Mo, Mn, K, Mg, Ca, Cu, Zn, Al, or a mixture of these.

5. The thermoplastic molding composition according to claim 1, in which component C) is used in a mixture with acid scavengers based on hydrotalcite or oxides or hydroxides or salts of zinc or of the alkaline earth metals.

6. The thermoplastic molding composition according to claim 5, in which the mixing ratio (ratio by weight) of component C to the acid scavengers is from 10:1 to 1:10.

7. The thermoplastic molding composition according to claim 1, comprising, as component C),
from 30 to 65% by weight of CuO
from 15 to 60% by weight of ZnO
from 10 to 35% by weight of aluminum oxide
from 0 to 5% by weight of further promoters
where the total of the percentages by weight does not exceed 100% by weight.

8. The thermoplastic molding composition according to claim 1, in which component D) comprises an ethylene copolymer which comprises from 0.1 to 20% by weight of functional monomers.

9. The thermoplastic molding composition according to claim 1, where component D) comprises functional monomers selected from the group of the carboxylic acid, anhydride, carboxylic ester, carboxamide, carboximide, amino, hydroxy, epoxy, urethane, and oxazoline groups, and mixtures of these.

10. A method for producing fibers, films, and moldings comprising utilizing the thermoplastic molding composition according to claim 1.

11. A fiber, a film, or a molding obtainable from the thermoplastic molding composition according to claim 1.

* * * * *